Dec. 16, 1969　　　　N. S. BERS　　　　3,483,746
THREE-AXIS INERTIAL REFERENCE SENSOR
Filed Oct. 17, 1966　　　　2 Sheets-Sheet 1
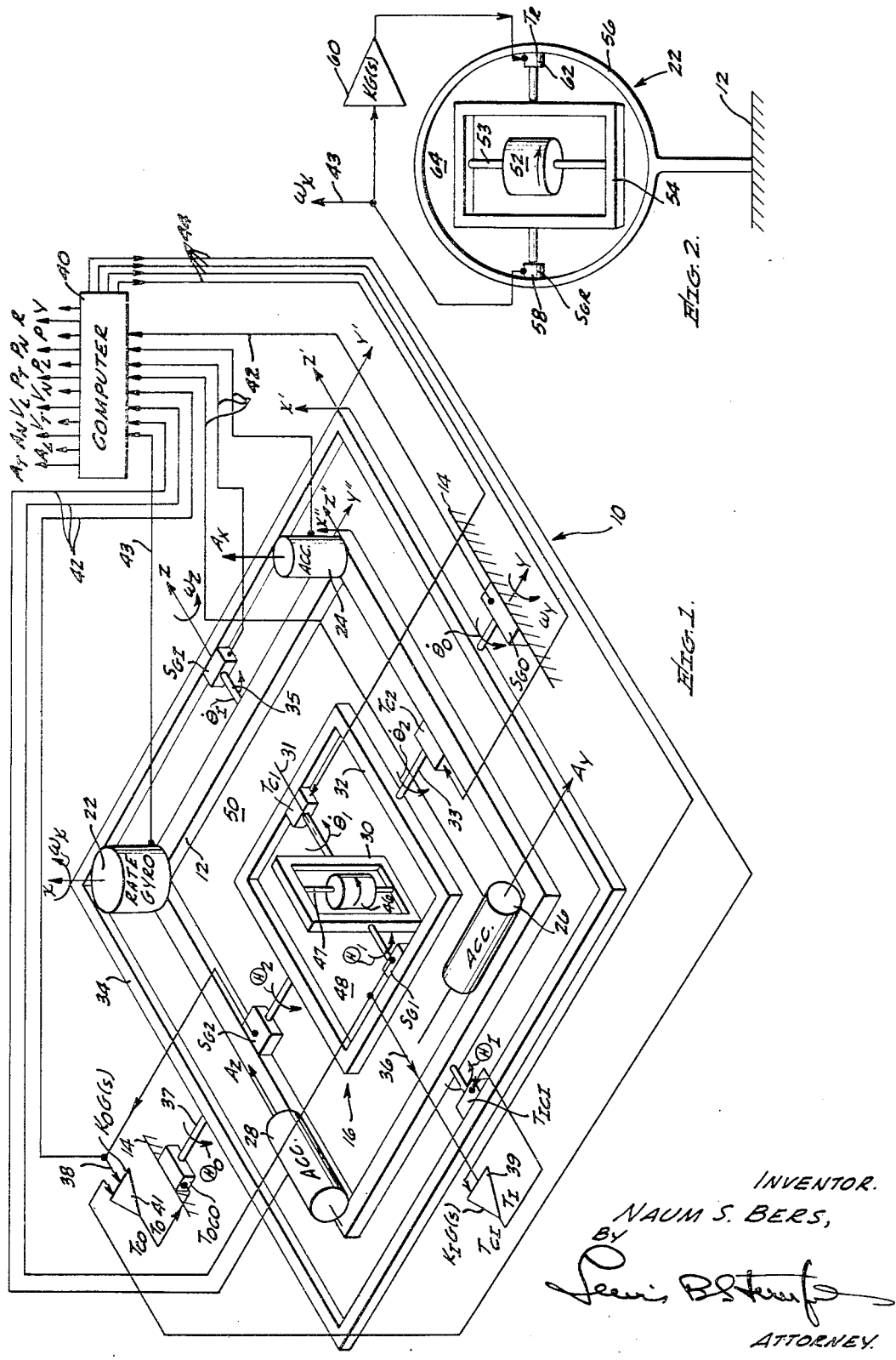
INVENTOR.
NAUM S. BERS,
ATTORNEY.

United States Patent Office 3,483,746
Patented Dec. 16, 1969

---

3,483,746
THREE-AXIS INERTIAL REFERENCE SENSOR
Naum S. Bers, Los Angeles, Calif., assignor to Hughes Aircraft Company, Culver City, Calif., a corporation of Delaware
Filed Oct. 17, 1966, Ser. No. 587,050
Int. Cl. G01c 21/00, 19/00, 17/00
U.S. Cl. 73—178                                  5 Claims

ABSTRACT OF THE DISCLOSURE

The three-axis inertial reference sensor comprises a platform which is gimbaled about two orthogonal axes of the platform, and which with respect to inertial space rotates only with rotation of the vehicle about an axis normal to the plane of the first two axes; that is, this plane of the platform is maintained in its starting point attitude in space. Angular movement about the normal axis is measured by a rate gyroscope on the platform. The platform includes a two degree-of-freedom gyroscope directly connected to a computer which is spatially removed from the platform. The computer processes the angular and linear information from the platform sensors to obtain data of the vehicle's attitude and translation and generates torques which are fed back into the platform gimbal torquers to compensate for angular velocity disturbances on the system.

---

The present invention relates to a three-axis inertial reference sensor including a two-axis platform system and, more particularly, to such a sensor wherein the platform is free to rotate about an axis normal thereto, relative to inertial space, with the vehicle on which it is mounted, and wherein angular movement about the normal axis is sensed through a rate gyroscope.

The well-known three-axis platform system includes a stabilized element or platform which is non-rotatably held in position in space by the incorporation of an assembly of three single-degree-of-freedom rate-integrating gyroscopes, or a single two-degree-of-freedom gyroscope plus one single-degree-of-freedom rate-integrating gyroscope, or two two-degree-of-freedom gyroscopes. Three rectilinear accelerometers are included within the platform system in order to measure the acceleration of the vehicle in which the platform system is incorporated. The non-rotating stable element or inner gimbal is gimbaled along three axes so that any movement of the vehicle to which it is attached will not be imparted to the stabilized element. To ensure the non-rotational attitude of the inner gimbal, all three gimbals are torqued through output signals from the platform gyroscopes and these signals, which control the torquing of the outer two gimbals, must be resolved because the outer two gimbals rotate with the vehicle. A resolver, therefore, is conventionally used to accomplish this purpose.

Because the above-described stabilized element requires three gimbals and other apparatus associated therewith to maintain the fixed spatial position of the stabilized element, several problems arise. Each gimbal must be journaled in substantially frictionless bearings and the assembly of gimbals must be accurately constructed to insure a properly balanced, aligned and temperature compensated system; however, any inaccuracies in any one gimbal may accumulate to impair the proper functioning of the system. In addition, the resolution of the gyro signals to control the torquing of the outer two gimbals necessitates the use of a relatively complicated resolver. The requirement of such precise and complicated equipment increases the possibilities of malfunction and, regardless of the degree of precision of the components, the device may still retain some of the above-mentioned deficiencies. In addition, any of the several component parts may deteriorate over a period of time to impair proper performance of the assembled system.

The present invention simplifies and reduces the number of component parts in the system and, consequently, increases the efficiency thereof. The invention includes a two-axis platform, the plane of said two axes being mechanized in such a manner as to prevent rotation of the platform relative to inertial space about any axis contained within the plane. It follows, therefore, that not only is the plane stabilized but also all lines or axes normal thereto are inherently stabilized. By sensing any rotation about such normal axes or lines, the attitude of the platform may be determined.

The invention accomplishes this result by gimballing the platform about two axes and by securing an instrument thereto which measures the rate of rotation of the platform about an axis normal thereto. By mechanizing the three-axis inertial reference sensor in this manner, the resolution of the gimbal angles is greatly simplified over the well-known three-axis platform system such that only a simple cosine angle resolution is required. This resolution and other computations along with their associated hardware is spatially removed, that is, placed substantially outside of the platform system and its moving parts to simplify its mechanization.

All the computations are performed in an associated computer which processes the various angular and linear information from the platform system so that various data of the vehicle's attitude and translation may be obtained. In addition, the computer generates torques which are fed back into the platform system to compensate for angular velocity disturbances on the system.

It is, therefore, an object of the present invention to provide a simple, yet reliable, inertial guidance system.

Another object is the provision of an inertial reference sensor of simplified construction.

A further object is to provide a sensor of low weight.

Another object is the provision of an efficient and accurate inertial reference sensor.

Still another object is to provide a system having simple sine or cosine trigonometric signal resolution means.

Another object is the provision of a novel means for compensating for angular velocity disturbances on the platform.

Other aims and objects as well as a more complete understanding of the present invention will appear from the following explanation of an exemplary embodiment and the accompanying drawings thereof, in which:

FIG. 1 schematically illustrates a first embodiment of the invention including a single two-degree-of-freedom gyroscope and associated electronic equipment;

FIG. 2 illustrates the rate gyroscope employed in FIG. 1; and

Figure 3:
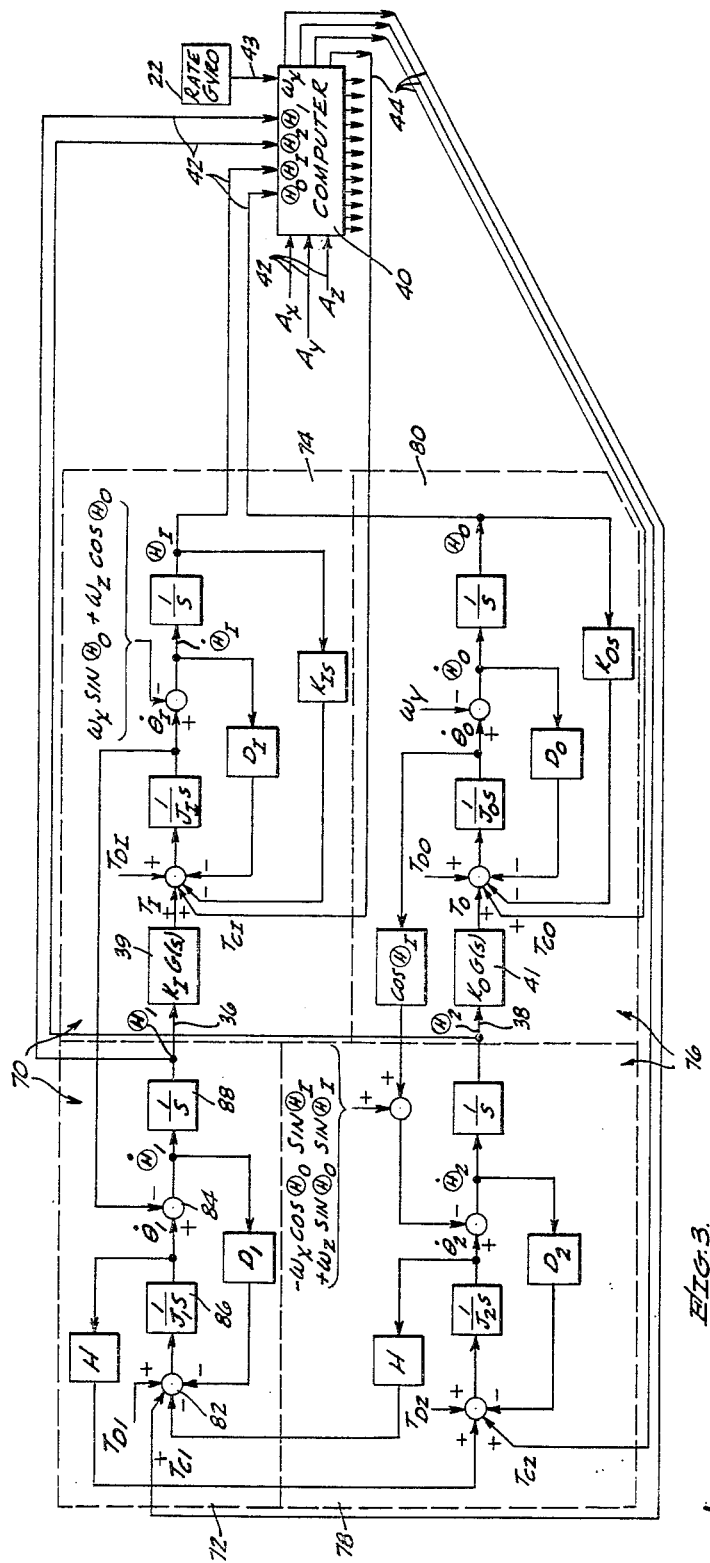
FIG. 3 is a functional block diagram of the embodiment.

With reference to FIG. 1, a three-axis inertial reference sensor 10 comprises a two-axis stabilized element or platform 12 which is journaled within a vehicle 14 about two orthogonal axes Y—Y and Z—Z, respectively, one of which is fixed in the vehicle, and which supports a two-degree-of-freedom gyroscope 16 (FIG. 1). A rate gyroscope 22 is secured to platform 12 to measure the rate of rotation thereof about an axis X—X which is orthogonal to the plane of platform 12 defined by axes Y—Y and Z—Z. Translational information along the axes X—X, Y—Y and Z—Z is obtained from accelerometers 24, 26 and 28 which are orthogonally positioned with respect to each other on the platform. Consequently, by combining the angular information from rate gyroscope 22 and other components associated with the platform and the translational information from the accelerometers, the attitude and location of vehicle 14 in space may be determined.

In order to facilitate a better understanding of the invention, several of the components and the angular information associated therewith are labeled according to their position with respect to platform 12. Thus, the term "gyro" is used in conjunction with those components and the information derived therefrom which are contained within the platform and, therefore, which are related to gyroscope 16 or gyroscopes 18 and 20. Furthermore, since gyroscope 16 comprises a gyro inner gimbal 30 and a gyro outer gimbal 32, information related to gimbals 30 and 32 is respectively designated by the subscript numerals "1" and "2." Similarly, the term "platform" is used to define the assembly of all components which have no relative motion with respect to the stabilized plane. In addition, because the platform itself is provided with two degrees of freedom along axes Y—Y and Z—Z by use of an outermost gimbal 34, information arising from relative rotation between platform 12 and outermost gimbal 34 is designated by the sumscript "I" and angular information between vehicle 14 and the outermost gimbal is designated by the subscript "O."

This information may be summarized as follows:

A. Input disturbance signals (1) Gyro gimbal torques:
  $T_{D1}$, about axis 31 of inner gimbal 30
  $T_{D2}$, about axis 33 of outer gimbal 32
(2) Platform gimbal torques:
  $T_{DI}$, about axis 35 of platform 12
  $T_{DO}$, about axis 37 of outermost gimbal 34
(3) Vehicle angular velocities:
  $\omega_X$, X-axis angular velocity
  $\omega_Y$, Y-axis angular velocity
  $\omega_Z$, Z-axis angular velocity B. Output performance signals (1) Relative gyro gimbal attitudes—Position, velocity, acceleration:
  $\theta_1$, $\dot{\theta}_1$, $\ddot{\theta}_1$, between inner and outer gimbals 30 and 32
  $\theta_2$, $\dot{\theta}_2$, $\ddot{\theta}_2$, between outer gimbal 32 and platform 12
(2) Attitude of gyro gimbals—Position, velocity, acceleration:
  $\theta_1$, $\dot{\theta}_1$, $\ddot{\theta}_1$, about axis 31 of inner gimbal 30
  $\theta_2$, $\dot{\theta}_2$, $\ddot{\theta}_2$, about axis 33 of outer gimbal 32
(3) Relative platform and outermost gimbal attitudes:
  $\theta_I$, $\dot{\theta}_I$, $\ddot{\theta}_I$, between platform 12 and outermost gimbal 34
  $\theta_O$, $\dot{\theta}_O$, $\ddot{\theta}_O$, between outermost gimbal 34 and vehicle 14
(4) Attitude of platform and outermost gimbal—Position, velocity, acceleration:
  $\theta_I$, $\dot{\theta}_I$, $\ddot{\theta}_I$, platform 12 about its axis 35
  $\theta_O$, $\dot{\theta}_O$, $\ddot{\theta}_O$, outermost gimbal 34 about its axis 37
(5) $\theta KG(s)$ servo torques (a frequency dependent multiple of the gyro output signal) wherein K is the gain or amplification factor and $G(s)$ is the signal shaping or filtering characteristic:
  $T_I$, about axis 35 of platform 12
  $T_O$, about axis 37 of outermost gimbal 34
(6) Computer 40 generated servo torques:
  $T_{C1}$, about axis 31 of gyro inner gimbal 30
  $T_{C2}$, about axis 33 of gyro outer gimbal 32
  $T_{CI}$, about axis 35 of platform 12
  $T_{CO}$, about axis 37 of outermost gimbal 34

C. System parameters (1) Gyro 16 parameters:
  H=gyro spin angular momentum
  $J_1$=gyro inner gimbal 30 moment of inertia about its axis of rotation
  $J_2$=gyro outer gimbal 32 moment of inertia about its axis of rotation
  $D_1$=gyro damping coefficient
  $D_2$=gyro damping coefficient
(2) Platform 12 parameters:
  $J_I$=platform 12 moment of inertia about its Z axis
  $J_O$=outermost gimbal 34 plus platform 12 moment of inertia about axis of rotation of outermost gimbal 34
  $K_{IS}$=platform 12 spring coefficient
  $K_{OS}$=outermost gimbal 34 spring coefficient
  $D_I$=platform 12 damping coefficient
  $D_O$=outermost gimbal 34 damping coefficent
  $K_I$=platform inner stabilization loop gain
  $K_O$=platform outer stabilization loop gain
(3) Parameters, in general:
  s=Laplace operator
  $G(s)$=Laplace transform of compensation network=
  $$\frac{as^2+bs+1}{cs^2+ds+1}$$

The various gimbals and the platform are journaled in substantially frictionless bearings with respect to each other and the vehicle in the well-known manner and, consequently, various journaled connection are depicted schematically with various signal generators, $S_G$, and various torquers, T, being secured between related bearings and shafts. Thus, signal generator $S_{G1}$ senses the relative angle about a shaft 31 between gyro inner gimbal 30 and gyro outer gimbal 32 while torquer $T_{C1}$ provides a torque therebetween. In a similar manner, signal generator $S_{G2}$ and torquer $T_{C2}$ are placed between the platform and the gyro outer gimbal on the shaft 33, signal generator $S_{GI}$ and torque $T_{ICI}$ are displosed between the outermost gimbal and the platform on a shaft 35 and signal generator $S_{GO}$ and the torquer $T_{OCO}$ are positioned between the vehicle and the outermost gimbal on a shaft 37.

An electrical connection 36 leads from signal generator $S_{G1}$ to a pulse torquing amplifier 39 having a transfer function $K_IG(s)$ in order to provide a torque of the magnitude $T_I$ to torquer $T_{ICI}$ while an electrical connection 38 leads from signal generator $S_{G2}$ to a pulse torquing amplifier 41 having a function $K_OG(s)$ for a supply of a torque of the magnitude $T_O$ to torquer $T_{OCO}$. In each of the pulse torquing amplifiers of the type $KG(s)$, the output torque is a frequency dependent output multiple of the gyroscopic output signal from the signal generator. Amplifiers 39 and 41 are of a well-known construction and perform the function of amplification [K] having a shaping characteristic [$G(s)$] in the form of a filter.

Signals are furthermore fed to a digital computer 40 of well-known construction by leads 42 and 43 from signal generators $S_{G1}$, $S_{G2}$, $S_{GI}$ and $S_{GO}$, from rectilinear accelerometers 24, 26 and 28, and from rate gyroscope 22, these signals being all in incremental form. The signal from the rate gyroscope, which is a measure of the angular velocity $\omega_X$ of platform 12, is furthermore processed by computer 40 and is fed back through leads 44 into torquers $T_{C1}$ and $T_{C2}$ and into amplifiers $K_IG(s)$ and $K_OG(s)$, the latter two amplifiers combining the computer torques $T_{CI}$ and $T_{CO}$ respectively with the torques $T_I$ and $T_O$ aroused by signal generators $S_{G1}$ and $S_{G2}$ for supply to torquers $T_{ICI}$ and $T_{OCO}$. These torques $T_{C1}$, $T_{C2}$, $T_{CI}$ and $T_{CO}$ are used to compensate for the disturbance angular velocities $\omega_X$, $\omega_Y$ and $\omega_Z$ as well as for any predetermined drift of the gyroscope and platform during vehicle acceleration.

Computer 40 processes these and the linear acceleration signals in order to show the angular and translational data of vehicle 14, as depicted in FIGS. 1 and 3 wherein:

$A_T$=Acceleration in the vehicle's transverse direction
$A_L$=Acceleration in the vehicle's longitudinal direction $A_N$=Acceleration in the vehicle's normal direction
$V_T$=Velocity in the vehicle's transverse direction
$V_L$=Velocity in the vehicle's longitudinal direction
$V_N$=Velocity in the vehicle's normal direction
$P_T$=Position in the vehicle's transverse direction
$P_L$=Position in the vehicle's longitudinal direction
$P_N$=Position in the vehicle's normal direction
P=Pitch
R=Roll
Y=Yaw Two-degree-of-freedom gyroscope 16, in addition to having orthogonally journaled gimbals 30 and 32 is provided with a rotor 46 which is journaled on a shaft 47 in a well-known manner about its spin axis in gyro inner gimbal 30.

Preferably, damping means not shown, but represented in the drawing by numerals 48 and 50 in the form of a viscous fluid is placed between gimbals 30 and 32 and between platform 12 and gyro outer gimbal 32, respectively, for purposes of adequate stability.

Rate gyroscope 22 (see FIG. 2) is of conventional design and comprises a rotor 52 journaled on a shaft 53 about its spin axis in a gimbal 54 which, in turn, is journaled in a gyro case 56. A signal generator 58 is secured between the case and gimbal 54 to sense the relative angles therebetween and to feed this angular information to computer 40 through lead 43 and to pulse torquing amplifier 60 to provide a pulse torquing restraint on gyroscope 22. Amplifier 60 energizes a torquer 62 which is also connected between case 56 and gimbal 54. Amplifier 60 is preferably pulse torqued so that the Euler angle about axis X—X may be generated through a pulse counting integration; however, an electronic integrator may be employed in order that the angular velocity about axis X—X, $\omega_X$, may be taken from gyroscope 22 as shown in FIG. 2. As in the case with gyroscope 16, rate gyroscope 22 is provided with a damping means not shown, but represented in the drawing by numeral 64 which is placed between gimbal 54 and case 56.

Referring now to FIG. 3, sensor 10 of FIG. 1 is illustrated in functional block diagram form wherein the various signals and parameters are defined as above. The sensor, as depicted in the block diagram, includes an inner stabilization loop 70 comprising a sensing portion 72 and a control portion 74 and an outer stabilization loop 76 comprising a sensing portion 78 and a control portion 80.

Sensing portion 72, which derives its information primarily from two-degree-of-freedom gyroscope 16, includes a pair of summing amplifiers 82 and 84 and a pair of integrators 86 and 88 to provide the relative gyro gimbal position $⊕_I$ between gyro inner and outer gimbals 30 and 32 which position $⊕_I$ is fed to computer 40 and to control portion 74. Both the summing and integration are performed by use of conventional gyroscopic apparatus, the integration being an inherent function of the gyroscope as is well-known in the art.

Inner stabilization loop portion 74 through pulse torquing amplifier 39, thereafter provides a torque $T_I$ which, as combined with the computer generated torque $T_{CI}$, is exerted on platform 12. The relative angular position $⊕_I$ between platform 12 and outermost gimbal 34 is produced by portion 74 which position $⊕_I$ is also fed to the computer. A comparison of FIGS. 1 and 3 therefore illustrates the manner in which information from signal generator $S_{G1}$ moves to amplifier 39 and torquer $T_{ICI}$.

Sensing portion 78 of outer stabilization loop 76 operates in a manner similar to that of sensing portion 72 to provide the relative gyro gimbal position $⊕_2$ between gyro outer gimbal 32 and platform 12. Position $⊕_2$ is fed to computer 40 and to control portion 80 which, in turn, produces the relative platform gimbal position $⊕_O$. Position $⊕_O$ is also fed into the computer. The connections of portions 78 and 80 parallel the flow of information from signal generator $S_{G2}$ into amplifier 41 and torquer $T_{OCO}$.

The block diagram of FIG. 3 also depicts the inputs of several angular velocity disturbances such as
$(=\omega_X \cos ⊕_O \sin ⊕_I + \omega_Z \sin ⊕_O \sin ⊕_I)$, $(\omega_X \sin ⊕_O + \omega_Z \cos ⊕_O)$ and $(\cos ⊕_I)$. These trigonometric inputs result, in part, from the fact that information relating to axes X and Z are taken from platform 12 and outermost gimbal 34 both of which are gimbaled with respect to axis Y.

Since rate gyroscope 22 is positioned on platform 12, the angular velocity $\omega_X$ about axis X affects loops 70 and 76 only through computer 40. Thus, the electronic apparatus on sensor 10 itself is greatly simplified because the electronic equipment associated with the rate gyroscope may be incorporated in computer 40 and, therefore, the efficiency of the sensor is increased over and made more reliable than the well-known three-axis platform system.

Although the invention has been described with reference to a particular embodiment thereof, it should be realized that various changes and modifications may be made therein without departing from the spirit and scope of the invention.

What is claimed is:

1. A three-axis inertial reference sensor comprising computational means and a two-axis stabilized element having gimbal means, torquers and signal generators on each of the two axes thereof and rotatable with respect to inertial space about an axis normal to the plane of the axes of stabilization of said element; a two degree-of-freedom gyroscope and a rate gyroscope for measuring the rate of rotation of said element about the normal axis, both gyroscopes being supported by said element; said two degree-of-freedom gyroscope having gimbal means, torquers and signal generators; said torquers and signal generators being connected to said gimbal means, directly connected to said computational means and respectively transmitting and receiving signals to and from said computational means.

2. A three-axis inertial reference sensor as in claim 1 wherein said rate gyroscope is rigidly secured to said element.

3. A three-axis inertial reference sensor as in claim 1 wherein said rate gyroscope comprises a rate integrating gyroscope provided with a pulse-torquing restraint.

4. A three-axis inertial reference sensor as in claim 1 further including three rectilinear motion accelerometers connected to said element for sensing translational motion thereof.

5. A three-axis inertial reference sensor as in claim 1 wherein said computational means includes a computer spatially removed from said element.

References Cited

UNITED STATES PATENTS

| | | |
|---|---|---|
| 2,914,763 | 11/1959 | Greenwood. |
| 2,949,785 | 8/1960 | Singleton et al. |
| 3,127,774 | 4/1964 | Fischer et al. |
| 3,229,533 | 1/1966 | Draper et al. |
| 3,258,977 | 7/1966 | Hoffman. |
| 3,281,581 | 10/1966 | Lerman et al. |
| 3,284,617 | 11/1966 | Lerman. |
| 3,310,876 | 3/1967 | Yamron. |
| 3,365,942 | 1/1968 | Blazek et al. |

FOREIGN PATENTS 379,135   8/1964   Switzerland.

ROBERT B. HULL, Primary Examiner

U.S. Cl. X.R.

33—226